(12) United States Patent
Richter (10) Patent No.: US 12,500,545 B2
(45) Date of Patent: Dec. 16, 2025

(54) SUPPORTING STRUCTURE FOR SUPPORTING SOLAR MODULES AND CEILING ELEMENTS

(71) Applicant: Michael Richter, Rechlinghausen (DE)

(72) Inventor: Michael Richter, Rechlinghausen (DE)

( * ) Notice: Subject to any disclaimer, the term of this patent is extended or adjusted under 35 U.S.C. 154(b) by 373 days.

(21) Appl. No.: 18/017,202

(22) PCT Filed: Apr. 30, 2021

(86) PCT No.: PCT/EP2021/061415
§ 371 (c)(1),
(2) Date: Jan. 20, 2023

(87) PCT Pub. No.: WO2022/017656
PCT Pub. Date: Jan. 27, 2022

(65) Prior Publication Data
US 2023/0291348 A1    Sep. 14, 2023

(30) Foreign Application Priority Data

Jul. 23, 2020 (DE) ............... 10 2020 004 452.2

(51) Int. Cl.
*H02S 20/30* (2014.01)

(52) U.S. Cl.
CPC ................. *H02S 20/30* (2014.12)

(58) Field of Classification Search
CPC .......... H02S 20/00; H02S 20/10; H02S 20/30; H02S 30/10; F24S 25/50; F24S 2025/017; F24S 2030/133; E04B 2001/1996

(Continued)

(56) References Cited

U.S. PATENT DOCUMENTS 2,622,546 A * 12/1952 Kramrisch ............... E04B 7/14
52/643
2,642,598 A *  6/1953 Beretta ................... E01D 11/02
14/18

(Continued)

FOREIGN PATENT DOCUMENTS

DE         19651444 A1    6/1998
DE       102010033702 A1    2/2012

(Continued)

OTHER PUBLICATIONS

DE102010033702A1 abstract, published Feb. 2, 2012, 1 page.

(Continued)

*Primary Examiner* — James M Ference
(74) *Attorney, Agent, or Firm* — Tod M. Melgar (57) ABSTRACT

A supporting including at least two supporting frameworks with supporting masts which are respectively connected to one another by means of a supporting cable, on which supporting cable the solar modules or ceiling elements are supported by means of vertical pressure rods which are connected to the supporting cable by means of fastening elements and which have a pretensioning force applied to them via at least one pretensioning cable, which pretensioning force pushes the pressure rods in the downward direction towards the supporting cable which is connected to said pressure rods, is distinguished in that the fastening elements comprise cable rollers or sliding elements by means of which the pressure rods are displaceably coupled to the supporting cables and pretensioning cables, and in that the pressure rods are coupled to the supporting masts non-displaceably in the horizontal direction by means of positioning cables in order to prevent a horizontal movement.

11 Claims, 9 Drawing Sheets

(58) Field of Classification Search
USPC .................................... 52/173.3, 146, 83
See application file for complete search history.

(56) References Cited

U.S. PATENT DOCUMENTS

| | | | | |
|---|---|---|---|---|
| 2,693,195 A * | 11/1954 | Frieder | ............... | E04H 15/18 |
| | | | | 52/63 |
| 2,878,498 A * | 3/1959 | Gollnow | ............... | E01D 11/00 |
| | | | | 14/19 |
| 3,211,163 A * | 10/1965 | Gugliotta | ............... | E04B 7/166 |
| | | | | 135/97 |
| 3,288,158 A * | 11/1966 | Gugliotta | ............... | E04B 7/166 |
| | | | | 52/63 |
| 4,832,001 A * | 5/1989 | Baer | ............... | F24S 50/20 |
| | | | | 136/246 |
| 4,835,918 A * | 6/1989 | Dippel | ............... | H02S 20/10 |
| | | | | 52/173.3 |
| 4,982,534 A * | 1/1991 | Saitoh | ............... | E04B 7/14 |
| | | | | 52/63 |
| 5,212,916 A * | 5/1993 | Dippel | ............... | H02S 20/10 |
| | | | | 52/82 |
| D605,585 S * | 12/2009 | Conger | ............... | F24S 25/50 |
| | | | | D13/102 |
| D633,033 S * | 2/2011 | Conger | ............... | F24S 25/50 |
| | | | | D13/102 |
| D649,112 S * | 11/2011 | Conger | ............... | F24S 25/50 |
| | | | | D13/102 |
| 8,056,555 B2 * | 11/2011 | Prueitt | ............... | F24S 23/74 |
| | | | | 136/246 |
| D655,672 S * | 3/2012 | Conger | ............... | F24S 25/50 |
| | | | | D13/102 |
| D664,916 S * | 8/2012 | Conger | ............... | F24S 25/50 |
| | | | | D13/102 |
| 8,274,028 B2 * | 9/2012 | Needham | ............... | F24S 30/425 |
| | | | | 136/246 |
| 8,399,759 B2 * | 3/2013 | Luo | ............... | F24S 30/455 |
| | | | | 136/246 |
| D679,242 S * | 4/2013 | Conger | ............... | F24S 25/50 |
| | | | | D13/102 |
| 8,448,390 B1 * | 5/2013 | Clemens | ............... | F24S 25/50 |
| | | | | 52/173.3 |
| 9,564,851 B2 * | 2/2017 | Conger | ............... | E04C 3/30 |
| 9,753,264 B2 * | 9/2017 | Karidis | ............... | H02S 20/30 |
| 9,927,150 B2 * | 3/2018 | Eckl | ............... | F16M 11/18 |
| 10,615,738 B2 * | 4/2020 | Sgarrella | ............... | E02D 5/223 |
| 10,634,386 B2 * | 4/2020 | Adel | ............... | F24S 23/745 |
| 2005/0035244 A1 * | 2/2005 | Conger | ............... | F24S 25/50 |
| | | | | 52/173.3 |
| 2008/0168981 A1 * | 7/2008 | Cummings | ............... | H02S 20/10 |
| | | | | 52/690 |
| 2008/0283112 A1 * | 11/2008 | Conger | ............... | F24S 25/50 |
| | | | | 136/244 |
| 2008/0283113 A1 * | 11/2008 | Conger | ............... | H02S 20/10 |
| | | | | 136/244 |
| 2009/0038672 A1 * | 2/2009 | Conger | ............... | H02S 20/10 |
| | | | | 136/244 |
| 2010/0000516 A1 * | 1/2010 | Conger | ............... | H02S 20/32 |
| | | | | 126/569 |
| 2010/0089433 A1 * | 4/2010 | Conger | ............... | H02S 20/10 |
| | | | | 136/244 |
| 2010/0108113 A1 * | 5/2010 | Taggart | ............... | F24S 20/67 |
| | | | | 135/96 |
| 2010/0294265 A1 * | 11/2010 | Baer | ............... | F24S 25/50 |
| | | | | 126/714 |
| 2010/0313500 A1 * | 12/2010 | Beck | ............... | F24S 25/50 |
| | | | | 52/173.3 |
| 2010/0314509 A1 * | 12/2010 | Conger | ............... | H02S 20/10 |
| | | | | 248/121 |
| 2011/0155218 A1 * | 6/2011 | Buchel | ............... | F24S 30/455 |
| | | | | 136/246 |
| 2011/0208326 A1 * | 8/2011 | Dror | ............... | F24S 30/48 |
| | | | | 700/71 |
| 2011/0277809 A1 * | 11/2011 | Dalland | ............... | H02S 20/10 |
| | | | | 136/244 |
| 2012/0180407 A1 * | 7/2012 | Rees | ............... | E04C 3/10 |
| | | | | 52/173.3 |
| 2012/0298180 A1 * | 11/2012 | Ratti | ............... | F22B 1/006 |
| | | | | 136/246 |
| 2013/0068280 A1 * | 3/2013 | Luo | ............... | H02S 20/32 |
| | | | | 136/246 |
| 2013/0119206 A1 * | 5/2013 | Di Gaetano | ............ | F24S 25/50 |
| | | | | 24/115 R |
| 2013/0167912 A1 * | 7/2013 | Czaloun | ............... | F24S 30/428 |
| | | | | 136/251 |
| 2013/0291926 A1 * | 11/2013 | Matalon | ............... | H02S 20/32 |
| | | | | 136/246 |
| 2014/0190556 A1 * | 7/2014 | Conger | ............... | F24S 80/60 |
| | | | | 52/173.3 |
| 2016/0065116 A1 * | 3/2016 | Conger | ............... | H02S 20/10 |
| | | | | 136/251 |
| 2023/0291348 A1 * | 9/2023 | Richter | ............... | H02S 20/00 |

FOREIGN PATENT DOCUMENTS

| | | | | |
|---|---|---|---|---|
| WO | | 9322520 A1 | 11/1993 | |
| WO | WO-2008025001 A2 * | 2/2008 | ............ | F24S 20/80 |

OTHER PUBLICATIONS

DE19651444A1 abstract, published Jun. 18, 1998, 1 page.
WO9322520A1 abstract, published Nov. 11, 1993, 1 page.
Notification of transmittal of translation of the IPRP, application No. PCT/EP2021/061415, mailed Feb. 2, 2023, 1 pg.
English version of IPRP, application No. PCT/EP2021/061415, mailed Feb. 2, 2023, 6 pg.

* cited by examiner

SUPPORTING STRUCTURE FOR SUPPORTING SOLAR MODULES AND CEILING ELEMENTS

PRIORITY CLAIM

Applicant hereby claims priority under 35 U.S.C. § 119 to international application No. PCT/EP2021/061415, filed on Apr. 30, 2021, entitled SUPPORTING STRUCTURE FOR SUPPORTING SOLAR MODULES AND CEILING ELEMENTS, which further claims priority to German application ser. No. 10 2020 004 452.2, filed on Jul. 23, 2020. The entire contents of the aforementioned applications are herein expressly incorporated by reference.

FIELD OF INVENTION

This disclosure relates to a supporting structure for supporting solar modules and ceiling elements.

BACKGROUND

The generation of electrical energy from sunlight by means of photovoltaic solar modules in solar parks requires large areas which are frequently also able to be used or are already used for agriculture or other uses. In order to develop such areas for power generation by means of solar modules, supporting structures are used where the modules are arranged at a distance above the ground. This provides the advantage of a double use of the area, since the region below the solar modules can be used as a parking lot, arable land or as a storage area for objects, for example.

A collector array which comprises a plurality of solar modules which are arranged on a cable supporting structure is disclosed in DE 10 2010 033 702 A1. The cable supporting structure consist of masts, which forward the occurring forces into the subsoil, and supporting cables which are braced between the masts and absorb the weight of the solar modules. The frames on which the solar modules are received are supported by means of floating supports on the supporting cables which are fixed in the upward direction by means of pretensioning cables running in the opposite direction to the supporting cables. Both the supporting cables and the pretensioning cables running in the opposite direction thereto are fixedly connected to the masts and floating supports in order to prevent a horizontal movement of the floating supports and the solar modules received at the upper ends thereof. Since the floating supports with the solar modules arranged thereon protrude from the plane of the cable supporting framework in the vertical direction, there is a greater load requirement on the floating supports since additional bending moments are exerted on the floating supports by external force influences, such as wind or snow.

A further problem of the supporting framework disclosed in DE 10 2010 033 702 A1 is that the effort required for constructing the supporting framework is relatively large due to the fixed fastening of the floating supports to the supporting cables and pretensioning cables, and that a retensioning of the cables in the case of snow loads or temperature-related length alterations thereof is not possible or only possible with a great deal of time, since this requires the tensioning of each cable to be individually changed.

Accordingly, it is an object of the present disclosure to create a supporting structure for supporting roofing elements which can be constructed with little effort and in a short time, and which permits a simple retensioning of the cables to compensate for different roof loads and temperature-related changes in the tensile stress in the cables.

SUMMARY

This object is achieved according to an embodiment by a supporting structure having the features of described below.

In the supporting structure according to an embodiment, supporting frameworks are used in which the occurring loads are absorbed and diverted substantially in the form of pure tensile and compressive loads in a structure consisting of traction cables and compression bars. In particular, when using the supporting structure according to the embodiment for solar systems it is advantageous if the solar modules, which are also denoted hereinafter as PV modules, are all aligned in a defined direction and arranged at a defined angle. The prerequisite therefor is that the substructure forms a plane which generally runs plane-parallel to the ground. Irrespective of the installation site, this requirement is advantageously fulfilled by the supporting structure according to the embodiment, in contrast to such cable structures which are configured as nets, membranes or hanging ladders, in which the orientation of the panels is predetermined by the type of structure.

According to an embodiment, in contrast to known fixed roof structures, a cable structure which is denoted hereinafter as a "supporting framework" is used instead of a support designed in any shape. At least four cables are braced between two masts: one (or more) supporting cables, one (or more) pretensioning cables, and at least one upper and one lower positioning cable. Together with at least one vertical compression bar, the cables form an individual supporting framework. The vertical load which is generated by the solar modules, or also the ceiling elements, and which acts on the respective compression bars, according to the embodiment is introduced into the supporting cable by means of a bearing point which is movable, i.e. not fixed in position, relative to the supporting cable in the horizontal direction, and forwarded therefrom into the mast by means of its suspension points. The bearing points in the case of a load distributed uniformly on the compression bars and ignoring the dead weight of the supporting cable, due to physical reasons, (minimizing the potential energy of the system) are located on a line which substantially corresponds to an upwardly open parabola (square parabola $y=a\,x^2$). The same applies in reverse to the pretensioning cable which is assigned to each supporting cable and which in simple terms is arranged mirror-symmetrically above each supporting cable and which substantially describes the shape of a downwardly open parabola ($y=a\,x^2$). The pretensioning cable does not perform a load-bearing function but merely prevents the supporting structure from being set in vibration by external stimuli, for example by wind and/or manual swaying, for example in the case of ground tremors which, without the pretensioning cable, can lead to a rocking or springing of the compression bars on the cable, for example.

A further advantage of the use of pretensioning cables in combination with supporting cables which are movably received in the horizontal direction on the compression bars, is that the pretensioning force in the pretensioning cable can be changed in a simple manner at a central point, for example in an automated manner by a motor-operated actuator or a spring tensioner with variable pretensioning, or a weight which is guided over a roller and which can be supplemented by an additional weight in order to change the tensile stress in the pretensioning cable. This opens up the possibility of actively reducing the pretensioning which is exerted by the pretensioning cable via the compression bars on the associated supporting cable in the case of an increased roof load, for example in the event of a snow fall, in order to counteract sagging of the entire structure. This also opens up the possibility of actively dampening the vibrations which occur in the supporting framework and which are induced by wind suction forces or tremors, by changing the stress in the pretensioning cables by a vibration damper, or even actively by a motor-operated actuator, when a predetermined amplitude is exceeded.

According to an embodiment, the compression bars are coupled to the supporting cables and/or pretensioning cables by means of cable pulleys or sliding elements. As a result, it is achieved that the number of individual parts required is reduced and these parts can be manufactured as identical parts. This can be illustrated by the fact that the number of supporting cables and pretensioning cables required is exactly four, due to the preferred use of cable pulleys or sliding elements on the compression bars in combination with double cables for each supporting framework. If these cables were to be divided into a plurality of cable sections which in each case extend from a mast to a compression bar and onward from this compression bar to the next compression bar and therefrom onward to the opposing mast, a supporting framework which comprises only two masts and four compression bars, would already consist of 20 individual cables solely for the supporting and pretensioning function.

This advantageously results in the following effect: since the positioning of the compression bars is ensured by means of the positioning cables, the supporting framework is not distorted when the supporting cables are tensioned and the distances between the compression bars in the supporting framework are maintained once adjusted. Moreover, when the bearings are designed as rollers, they are all structurally the same. Accordingly, in known suspended cable structures, such as for example suspension bridges, each suspension point has to be adapted to the respective angle of the supporting cable relative to the vertical. The use of cable pulleys thus simplifies the mounting of the supporting frameworks and leads to lower costs due to the reduced complexity of the parts.

In contrast to the bearing points of the compression bars which are movable along the supporting cables and pretensioning cables, according to the embodiment the positioning cables are fastened to the compression bars in a manner which is fixed but adjustable in terms of angle or changeable in terms of angle, so that an upward and downward movement of the compression bars with the solar modules fastened thereto is possible, but not a longitudinal displaceability in the direction along a positioning cable. As has been recognized by the applicant, by the positioning cable being connected in a fixed position to the compression bars in the horizontal direction, the compression bars are prevented from tilting out of their vertical position. To this end, the compression bars are connected to the horizontally running positioning cables by means of thread tensioners and shackles, for example, so that they are not able to be displaced after the threaded tensioners have been adjusted, or only to a very slight extent if the tensioned positioning cable is overstretched due to an external action of force in the horizontal direction.

Since each compression bar is fixed by means of the positioning cables, the lateral deflection force which is inevitably produced by the design of the bearing point as a cable pulley or sliding element, can advantageously be absorbed without the use of additional components. The flatter the parabola of the supporting cable, the lower the deflection force of the compression bar. Only if an uneven number of compression bars is constructed in the supporting framework is the central compression bar free of this deflection force. All of the other compression bars strive to achieve this the central position, due to the "oblique" bearing on the supporting cable.

When using the supporting structure according to an embodiment as a substructure for a photovoltaic system according to the embodiment, the solar modules and optionally also the ceiling elements are fastened to the upper ends of the compression bars, resulting in the advantage that the solar modules are located in the upper plane of the entire structure and no shading is produced due to parts of the compression bars protruding upwardly in the vertical direction which, due to the increased electrical resistance associated therewith in a shaded PV module and the electrical series connection of PV modules in the known manner, lead to a disadvantageous reduction in the electrical power generated thereby.

In an embodiment, in addition to the positioning cables which are installed in the supporting framework parallel to the supporting cables and pretensioning cables, i.e. in the longitudinal direction of the supporting frameworks, in the region of their upper ends and lower ends the compression bars are additionally fixed in their position by lateral positioning cables running transversely to the direction of the supporting framework. These positioning cables are also fixed in position but arc connected to the compression bars so that they can be changed in terms of their length in order to prevent the compression bars from tilting over to the side. Alternatively or at the same time, however, spacer rods can also be used instead of lateral positioning cables.

According to a further embodiment, the supporting structure comprises two or more of the above-described supporting frameworks which are arranged parallel to one another. The positioning of the compression bars transversely to the supporting framework takes place by means of cross bracing and two spacer rods.

Additionally, a plurality of supporting frameworks can be arranged in succession along a row which has substantially the length of the base area spanned by the supporting structure. It is important here that in the inner supporting frameworks the horizontal force components of the one supporting framework and the force components of the following supporting framework cancel each other out. In contrast, the force components in the outer supporting frameworks of the supporting structure are compensated by means of guy ropes which are anchored in the ground and which are connected to the outer masts of the supporting framework and subject these outer masts to a tensile force component acting in the horizontal direction. This advantageously permits an arrangement of any number of supporting frameworks adjacent to one another, wherein due to the compensation of the moments of the adjoining supporting frameworks acting on the inner masts, the inner masts can be designed in a particularly simple manner in terms of construction.

The supporting frameworks which connect the masts together are denoted hereinafter as the main supporting frameworks. Further supporting frameworks are added in order to permit a planar arrangement of the structure according to the embodiment transversely to the main supporting frameworks, these further supporting frameworks not being supported by means of masts in the direction of the ground but connecting together the compression bars of the parallel main supporting frameworks in a floating manner. These supporting frameworks are denoted hereinafter as the secondary supporting frameworks. Thus in a supporting structure according to the embodiment, consisting of main supporting frameworks and secondary supporting frameworks, the totality of the compression bars forms a grid pattern which is significantly finer than that of the masts. If the masts are located 30 meters apart in both directions and five compression bars are arranged in each main supporting framework, for example, this produces a grid pattern consisting of suspension points which form in each case 6×6=36 arrays of 5×5 m size.

The horizontal forces of suitable edge masts can be absorbed at the outer junction points of both the main supporting frameworks and the secondary supporting frameworks, since the moment compensation described above cannot take place on the edge of the structure. Since for this reason, compared to the inner masts, the edge masts require a more complex reinforced structure of the masts with a reinforced foundation, it is advantageous to arrange as many supporting frameworks as possible adjacent to one another. As has been recognized by the applicant, the greater the number of supporting frameworks following one another, the lower the relative construction costs for each construction phase.

In the same manner as the ceiling elements, which can be used at the same time or alternatively and which have the same dimensions as the solar modules, according to the embodiment the solar modules re arranged on frames which are fastened to the upper ends of the compression bars. By arranging the supporting frameworks adjacent to one another in both directions, areas of any size can be built over.

A further advantage of the supporting structure according to the embodiment is that this supporting structure is constructed from a few simple components which can be mounted on site with the least possible effort. Moreover, the supporting structure according to the embodiment has the advantage that it is durable and simple to maintain, since the supporting cables and pretensioning cables can be retensioned by means of a single tensioning device, because the supporting cables and pretensioning cables are not received in a positionally fixed manner on the compression bars, without having to operate and readjust and maintain a plurality of individual tensioning devices one after the other, as is the case when the compression bars are fixed in a fixed position on the supporting cables or tensioning cables.

While it is conceivable to design the compression bars as double compression bars, the individual cables being centrally guided therebetween, in an embodiment the compression bars advantageously consist of individual tubes on which the supporting cables and pretensioning cables, which are designed in this case as parallel guided double cables to avoid a tilting moment, are received by means of cable pulleys or sliding elements. This opens up the possibility of a particularly simple mechanical structure of the supports on the compression bars in which the cable pulleys, for receiving the supporting cables and pretensioning cables on the compression bars, are fastened in a mechanically simple manner to the respective compression bar by means of a screw which can be screwed into a bore incorporated in the compression bar.

The last-described embodiment comprising double cables provides the possibility that, even during operation, for example on a still day, one of the two supporting cables can be replaced, for example when one of the supporting cables or pretensioning cables has been damaged by corrosion or mechanical action, since the design load of the supporting cables in such supporting frameworks generally is considerably greater than the actual dead weight of the structure. Thus the supporting cables are dimensioned such that in favorable conditions (no snow, little wind) an individual supporting cable can easily carry the structure alone and the additionally used supporting cable merely serves for redundant securing, or opens up the possibility of replacing a supporting cable during ongoing operation.

Moreover, when erecting the supporting structure according to an embodiment in a suspended position, it can be advantageous if the positioning cables are also fastened to the compression bars as parallel cables at the side. This results in the advantage that the positioning cables also absorb a part of the static load, whereby the structure can be of smaller dimensions as a whole.

According to a further embodiment, the PV panels form the upper plane of the supporting structure in order to avoid the system shading itself As has been recognized by the applicant, it would be uneconomical to erect the supporting frameworks so closely adjacent to one another that the PV panels (current standard size in 2020 ca. 1.0 m×1.6 m) are directly mounted between the tips of respectively four adjacent compression bars. According to the embodiment, therefore, a plurality of PV panels are mounted on an auxiliary frame, in particular consisting of bent metal sheets or profiles joined together, and then suspended together and from below into the respective array in the structure. In the embodiment, a total of 15 solar modules and/or ceiling elements can be arranged on such an auxiliary frame of, for example, ca. 5 m×5 m, wherein the ceiling elements can consist, for example, of glass in order to introduce sunlight into the spanned space which is located below the supporting framework, for example when the supporting framework is erected over an agricultural area.

Since each auxiliary frame has to have a certain overall height for reasons of statics, according to a further embodiment this auxiliary frame can be provided with corresponding fastening means, such as eyes or hooks, which are coupled together in an articulated manner by means of chains or cables or other articulated connecting elements to the upper ends of the compression bars, which to this end also have corresponding fastening means, in particular eyes or hooks. As a protection against stimuli due to wind, a counter-bracing can be implemented downwardly in the same fastening points on the auxiliary frame. Even in large systems, this embodiment advantageously permits a cost-effective mounting of the PV panels since the frames, with the solar modules mounted thereon, are lifted from the ground by means of corresponding cable pulleys into their end position above the pretensioning cables and can be fastened at the ends of the compression bars by means of the aforementioned chains or corresponding guy ropes or other articulated connections. This results in the advantage that the frames can be fitted with the modules in an efficient manner on the ground, and the use of a truck mounted crane can be dispensed with, which once again significantly reduces the costs for constructing the supporting framework according to the embodiment.

According to a further embodiment, the masts in the interior of a construction site are designed as simply and cost-effectively as possible in order to compensate for the additional cost incurred by the edge masts. This is possible since the horizontal tensile forces on the inner masts substantially cancel each other out. By constructing the inner masts in a manner in which only the vertical load (weight force) is dissipated vertically, the inner masts can be kept free of bending moments. As has been recognized by the applicant, advantageously the construction of the masts, and above all the foundations associated therewith, can be substantially simplified thereby, wherein the greater the number of supporting frameworks arranged one behind the other, the greater the advantage. If in each direction five supporting frameworks are arranged one behind the other in a row, there are 16 inner masts with four corner masts and 16 edge masts, for example, in the construction site. If, conversely, ten supporting frameworks are arranged in a row, the construction site already has 81 inner masts with four corner masts and 36 edge masts.

In an embodiment, it is accordingly provided that the cables in the inner masts are not directly fastened to the mast but to a suitable structure in the form of a floating bearing, which can move freely around the mast in the horizontal direction; in the vertical direction, however, the weight force is transmitted downwardly and possible suction action of the wind upwardly onto the mast. As a result, it is advantageously achieved that no bending moments act on the mast and at the same time the supporting framework is fastened in the vertical direction.

With the forgoing overview in mind, specific details will now be presented, bearing in mind that these details are for illustrative purposes only and are not intended to be exclusive.

DETAILED DESCRIPTION

As can be seen in the views of FIGS. 3, 4 and 8 and 9, a supporting structure 1 according to an embodiment for supporting a plurality of solar modules or ceiling elements 32 comprises at least two supporting frameworks 2. Each supporting framework 2 has two supporting masts 4 which are respectively connected to one another by means of a supporting cable 6, which substantially has the shape of a parabola when viewed from the side. The solar modules, or also ceiling elements 32, are supported on the supporting cable 6 by means of vertical compression bars 12 which are connected to the supporting cable 6 by means of fastening elements 14, further detail thereof being provided below. As can be seen here in the view of FIGS. 1 and 2 in detail, the compression bars 12 are subjected to a pretensioning force by means of at least one pretensioning cable 8 which has a shape which is complementary to the shape of the parabola of the supporting cable 6, which pretensioning force pushes the compression bars 12 in the downward direction toward the supporting cable 6 which is connected to said compression bars and on which the compression bars 12 are supported.

The supporting structure 1 is characterized in that the fastening elements are cable pulleys 14a or sliding elements 14b, or comprise such, by means of which the compression bars 12 are displaceably received on the associated supporting cable 6 and also on the pretensioning cable 8. The cable pulleys 14a are indicated schematically in FIGS. 2 and 4 and the sliding elements are indicated schematically in FIGS. 1 and 3, and not illustrated in FIGS. 8 and 9 for the sake of clarity. These compression bars are connected to the supporting masts 4 non-displaceably by means of positioning cables 10 in order to avoid a movement of the compression bars 12 in the horizontal direction, or the lateral direction in the case of inclined roof surfaces.

Figure 1:
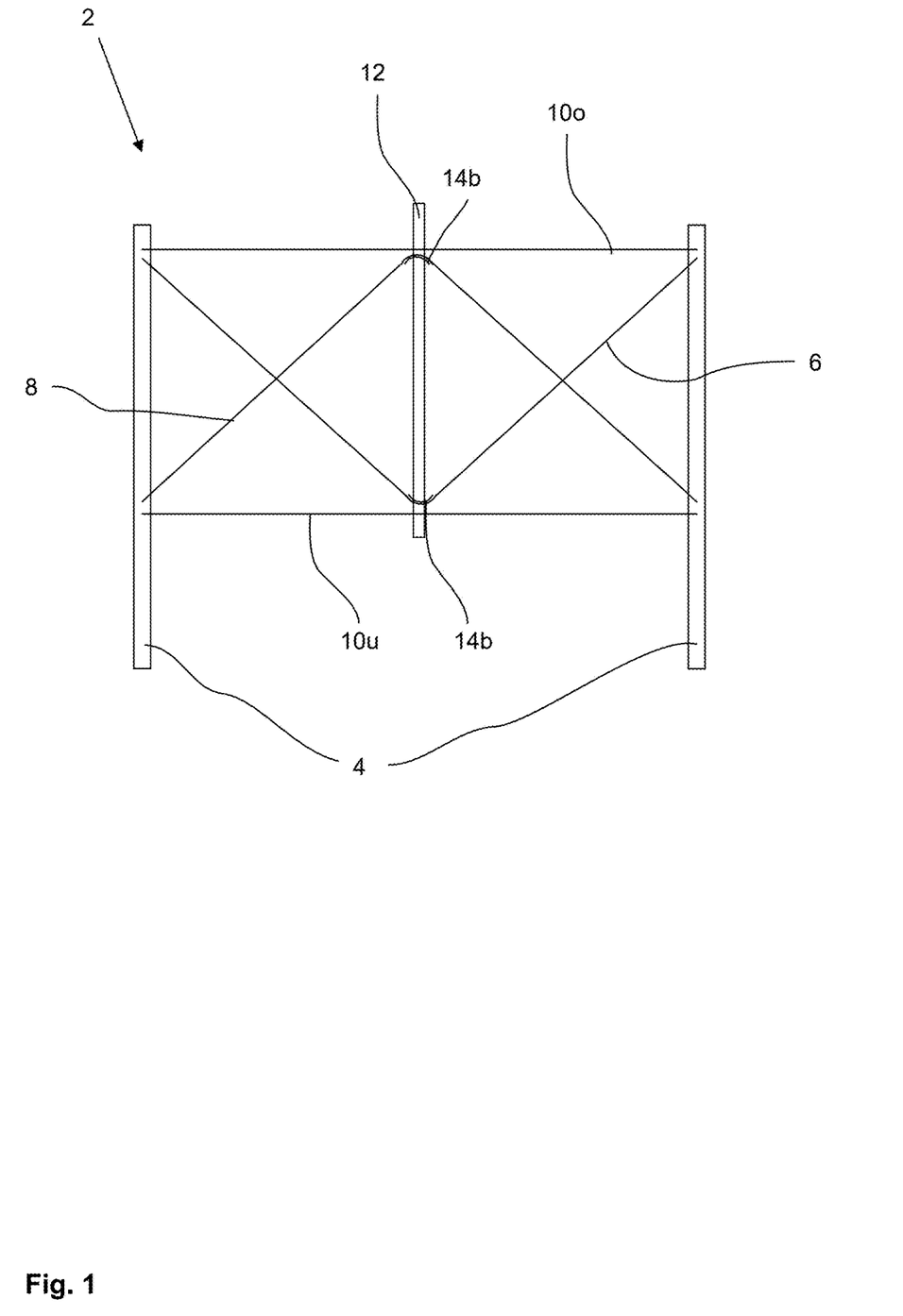
FIG. 1 shows a schematic view of an exemplary individual supporting framework with a compression bar.
Figure 2:
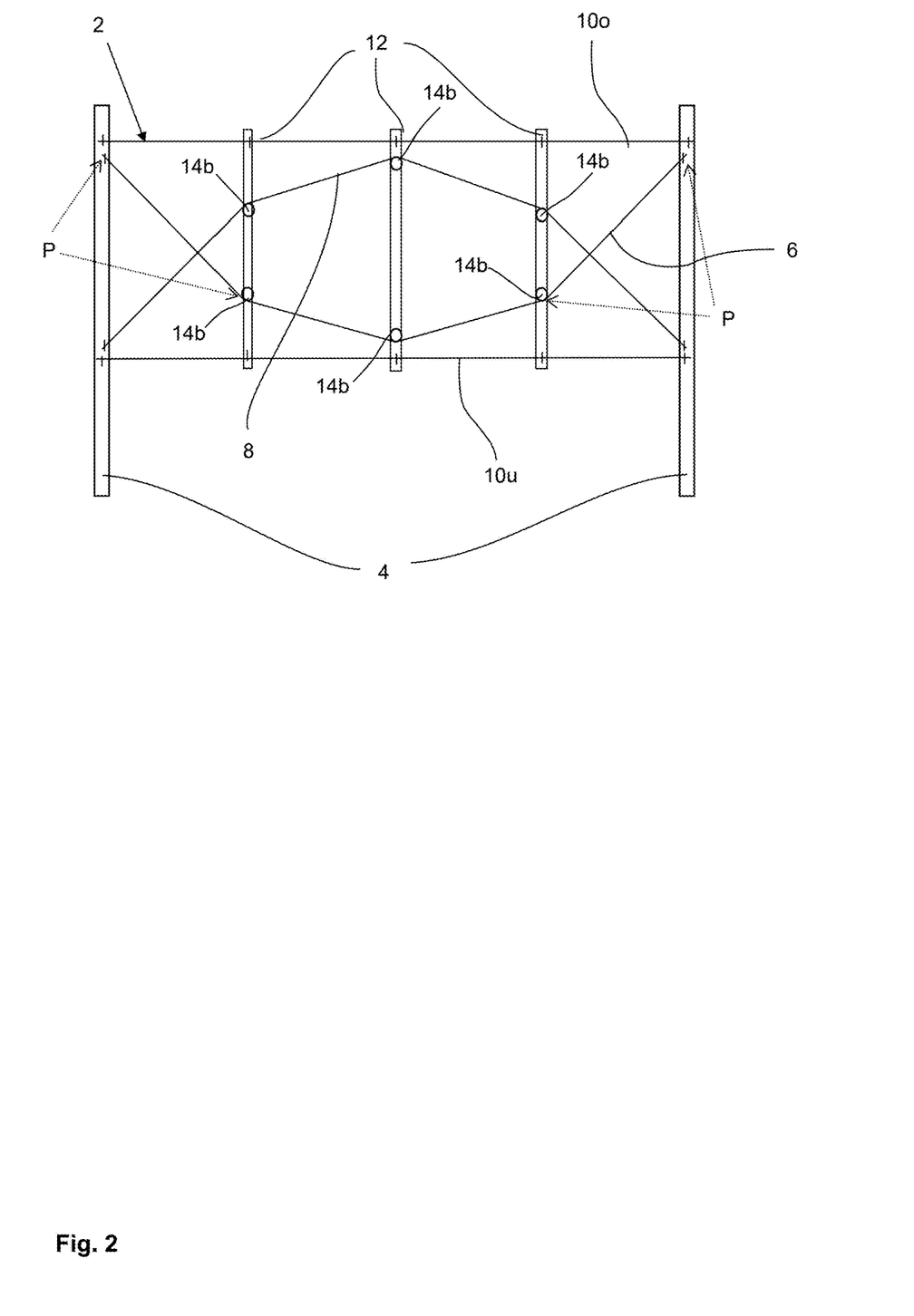
FIG. 2 shows a schematic view of a supporting framework with a plurality of compression bars.
Figure 3:
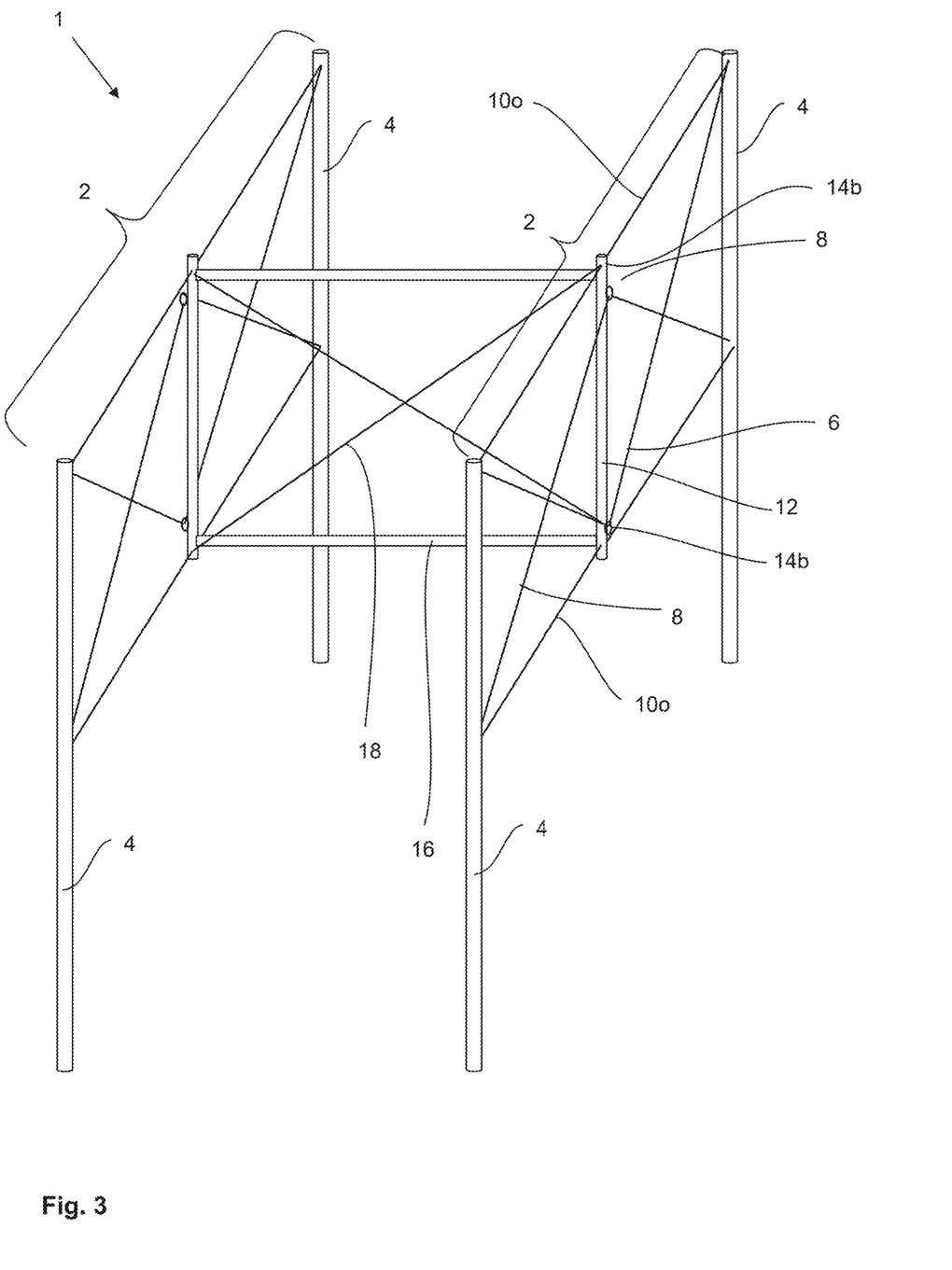
FIG. 3 shows a schematic view of a supporting structure according to an embodiment consisting of two parallel supporting frameworks which are coupled by means of spacer rods.

As is indicated in the embodiment shown in FIG. 1 of a supporting framework 2, the sliding elements can comprise arcuate guides, denoted hereinafter as sliding shoes 14b, which are fastened to the respective compression bar 12 and which for example have a sliding surface, not shown in more detail, which consists of one or even two superimposed plastics elements, via which the cables 6, 8 are guided. The arcuate sliding surfaces preferably have a Ushaped cross section and encompass the associated supporting cables and pretensioning cables 6, 8 at the sides so that when the cables are tensioned they cannot slip to the side of the sliding surfaces. Alternatively, in the simplest case the sliding elements can also be designed as eyes which are fastened to the compression bars 12, as indicated in FIG. 3 by way of example.

In an embodiment, the fastening elements 14 can be positioned at different heights on the compression bars 12, wherein the fastening position of a fastening element 14 on a compression bar 12 is selected as a function of its position relative to a supporting mast 4 according to the previously calculated shape of the parabola line, such that the lower faces and/or the upper faces thereof, in the case of compression bars 12 of the same length, are substantially located at the same height after the supporting cables 6 and the pretensioning cables 8 have been tensioned.

This results in the advantage that a supporting framework 2 according to the embodiment can be erected in a very short time, by laying out a supporting cable 6 and an associated pretensioning cable 8 together with the compression bars 12 on the ground, the compression bars 12 being coupled by means of the fastening elements 14 to the cables 6, 8, the entire construction being erected and connected to the adjacent supporting frameworks or being secured in the horizontal direction by auxiliary bracing. Subsequently, the cables 6,8 are tensioned alternately until the desired tension is achieved in the supporting cable 6 and the lower ends of the compression bars 12 are oriented along a line.

It can also be provided that the compression bars 12 can be changed in terms of their length, for example in the manner of telescopic supports, resulting in the advantage that the entire area which is spanned by the solar modules, or the ceiling elements 32, can be provided with an inclination which produces the greatest possible yield of the solar modules 32, as a function of the inclination of the ground. To this end, in the region of the top part in the edge region of the area, the extendable parts of the compression bars 12 are fully extended out of the stationary part of the compression bar 12 remaining between the supporting cable and tensioning cable 6, 8, whereas in the region of the low-lying part of the area spanned by the solar modules 32 the extendable parts of the compression bars 12 are pushed fully into the stationary parts of the compression bars 12. The advantage of the embodiment is that the optimal inclination of the area spanned by the solar modules 32, by a corresponding extension of the movable upper parts of the compression bars 12 on which the solar modules 32 are received, can be already implemented before mounting the modules or the auxiliary frames after the supporting framework 1 has been erected, which significantly reduces the amount of work required.

It can also be provided according to one embodiment, not shown in more detail in the figures, that the pretensioning cables 8 and/or the supporting cables 6 in each case comprise two or more cable sections which are connected together, in particular, by means of shackles. This results in the advantage that cable sections which are damaged over the course of time by corros 10n, for example, can be easily replaced in sections. The cable sections can also be connected together by known mechanical cable tensioning devices, such as for example screw tighteners, which are not shown in the drawings for the sake of clarity:

The supporting cables 6 and also the pretensioning cables 8 are multicables, in particular double cables, which in each case comprise two or more individual cables running in parallel to one another, whereby these cables can be replaced with minimal effort while the supporting structure 1 is in operation, as already mentioned above.

Figure 4:
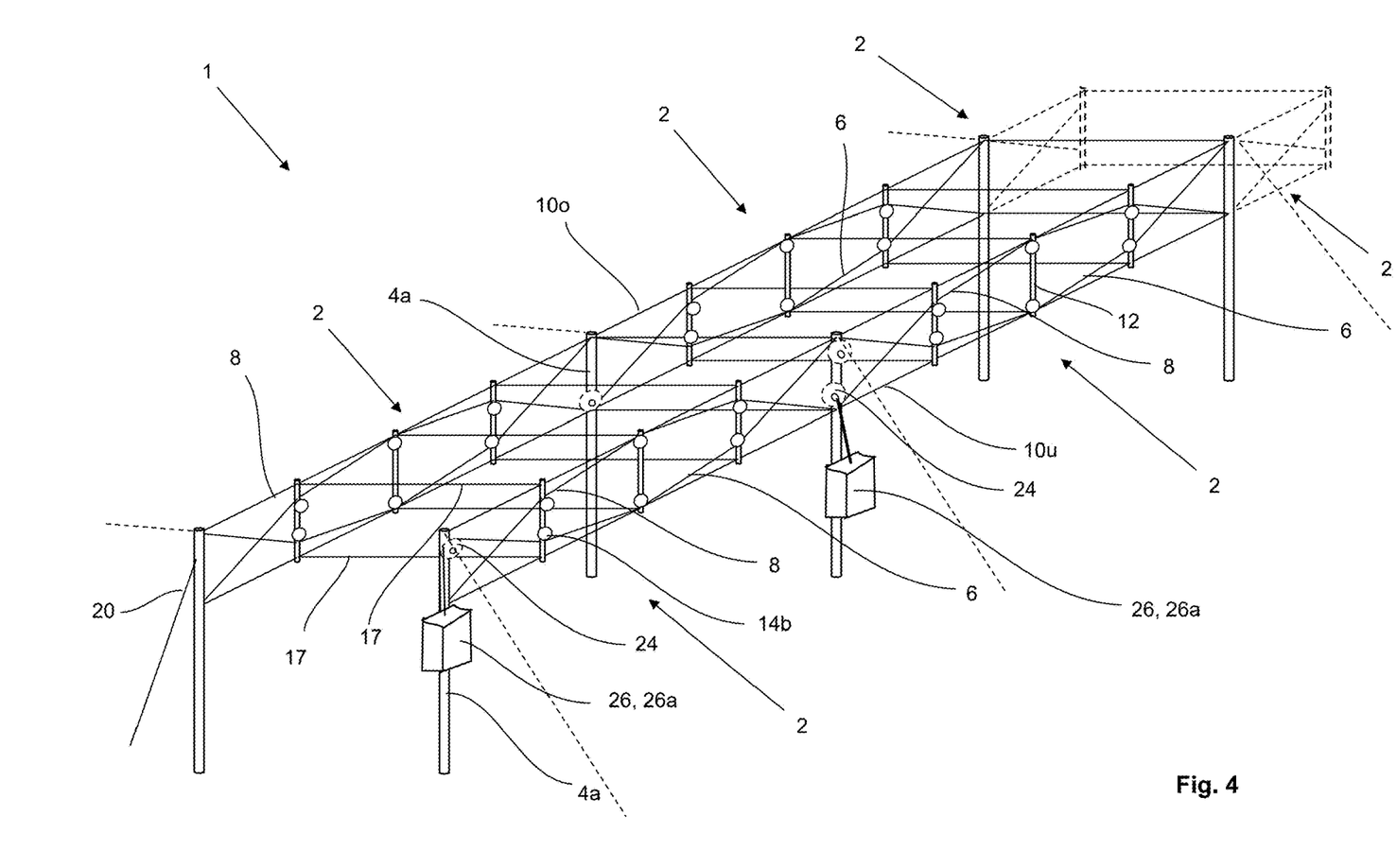
FIG. 4 shows a schematic view of a supporting structure according to an embodiment consisting of a plurality of supporting frameworks arranged in two parallel rows.
Figure 8:
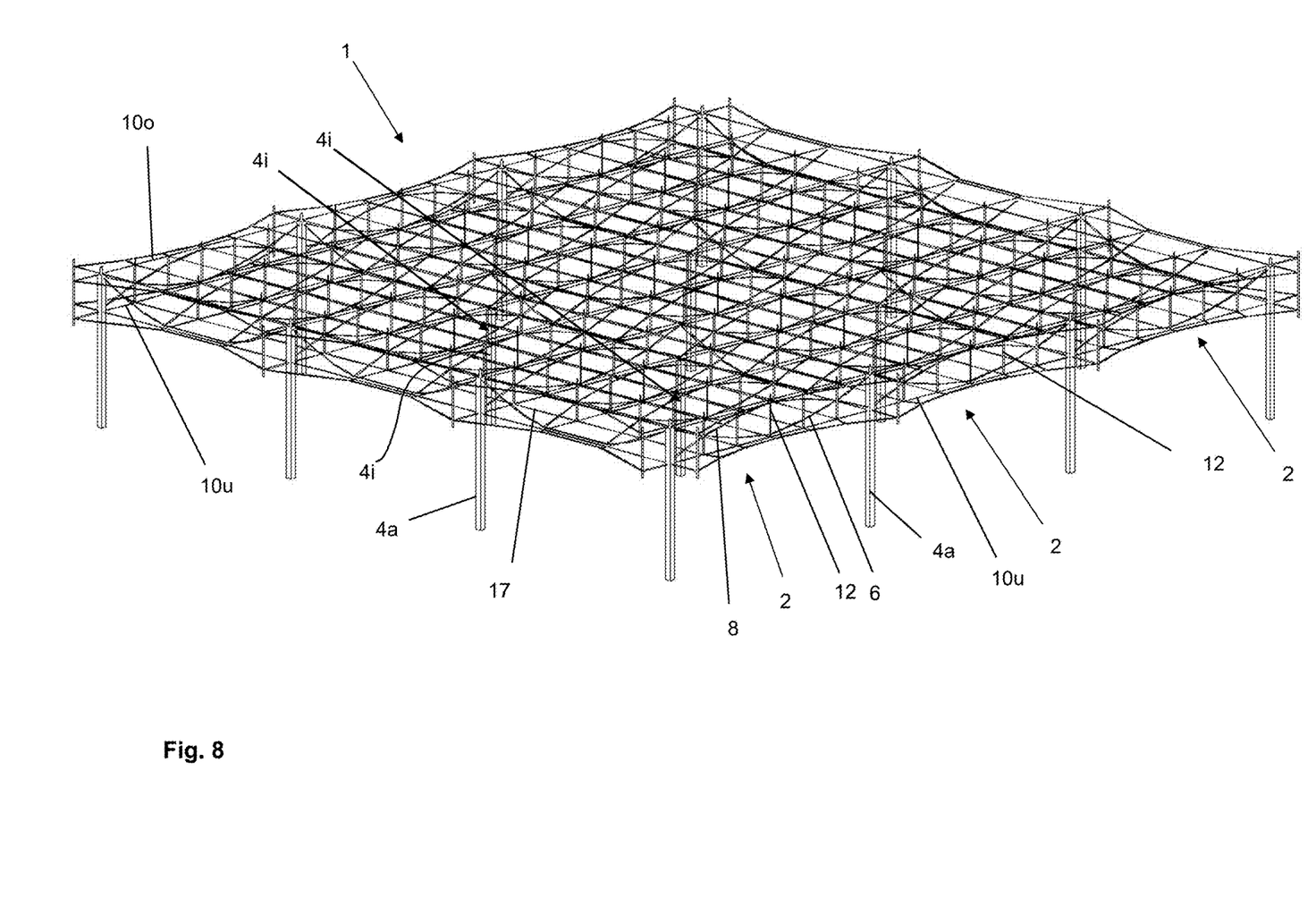
FIG. 8 shows a schematic overall view of a supporting structure according to an embodiment with 16 supporting masts and 10 rows of in each case three supporting frameworks arranged one behind the other without solar modules.
Figure 9:
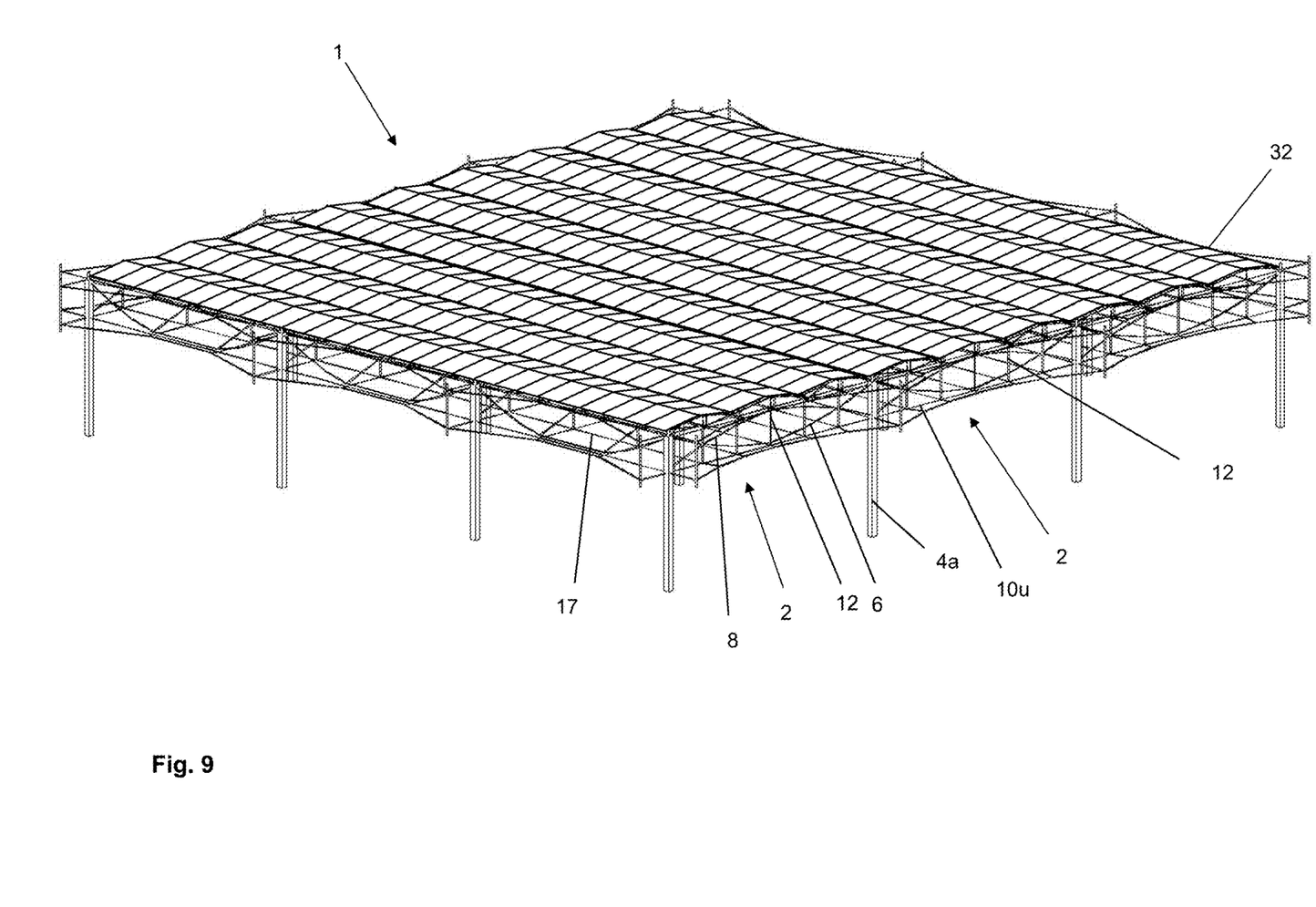
FIG. 9 shows the supporting structure of FIG. 8 with the illustrated solar modules.

As also indicated in FIGS. 3 and 4, the supporting cables 6 of two supporting frameworks 2 run in parallel to one another, when viewed in the longitudinal direction of the supporting structure 1. In a first embodiment, shown in FIG. 4, to this end the compression bars 12 of two adjacent supporting frameworks 2, when viewed in the transverse direction of the supporting structure 1, are arranged by means of lateral spacer rods 16 (FIG. 3) at a fixed distance from one another and braced together by transverse cables 18. At the same time or alternatively, there is the possibility of connecting together the supporting frameworks 2 running in parallel to one another by means of lateral positioning cables 17, wherein the tensile stresses in the longitudinal direction and in the transverse direction, as shown in FIGS. 8 and 9, are absorbed by means of the outer edge masts 4. Additionally, the tensile stresses can be forward into the ground by means of guy ropes, not shown in more detail in the figures.

Figure 6:
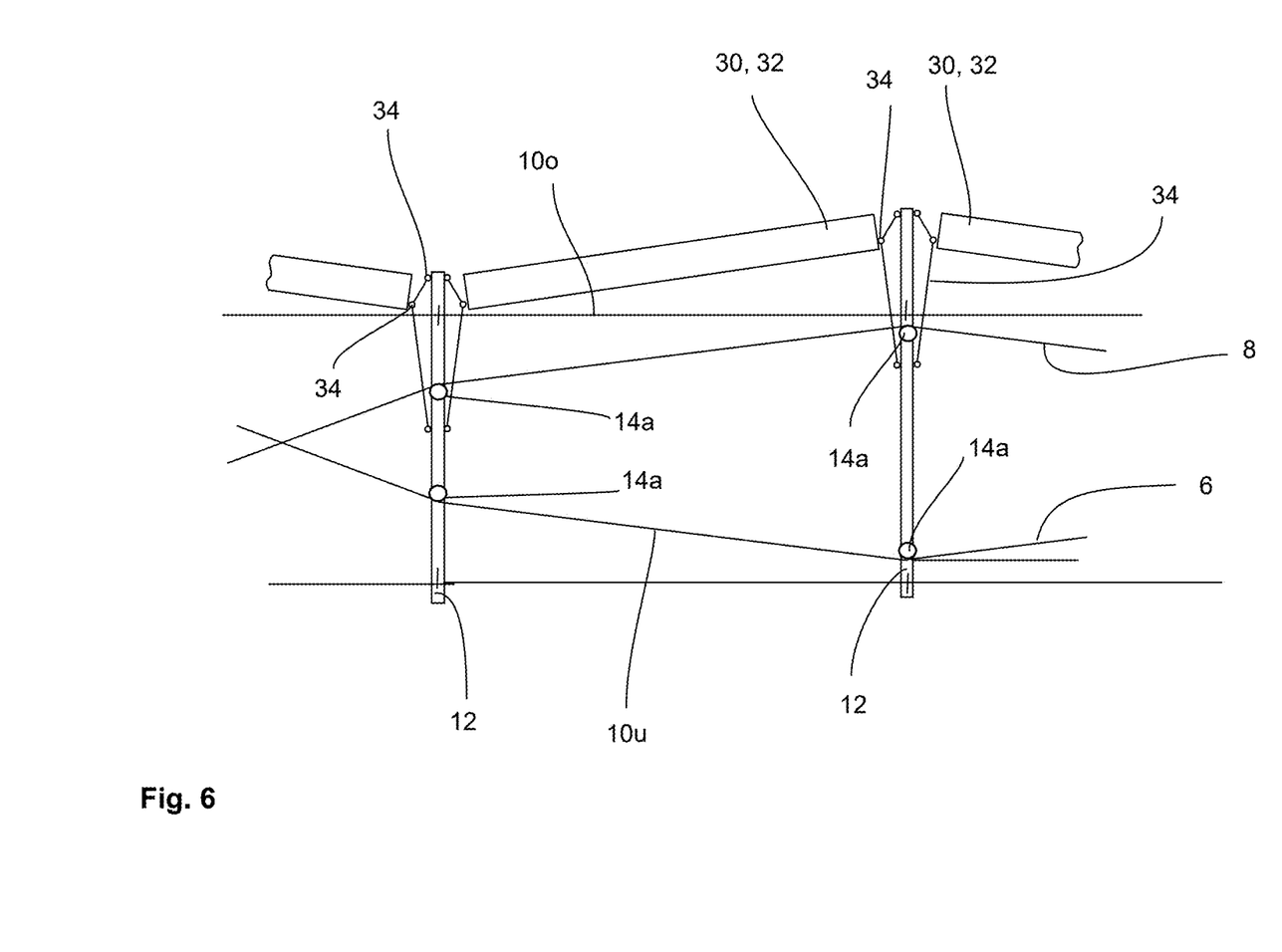
FIG. 6 shows a schematic partial side view of a supporting framework with auxiliary frames fastened thereto.
Figure 7:
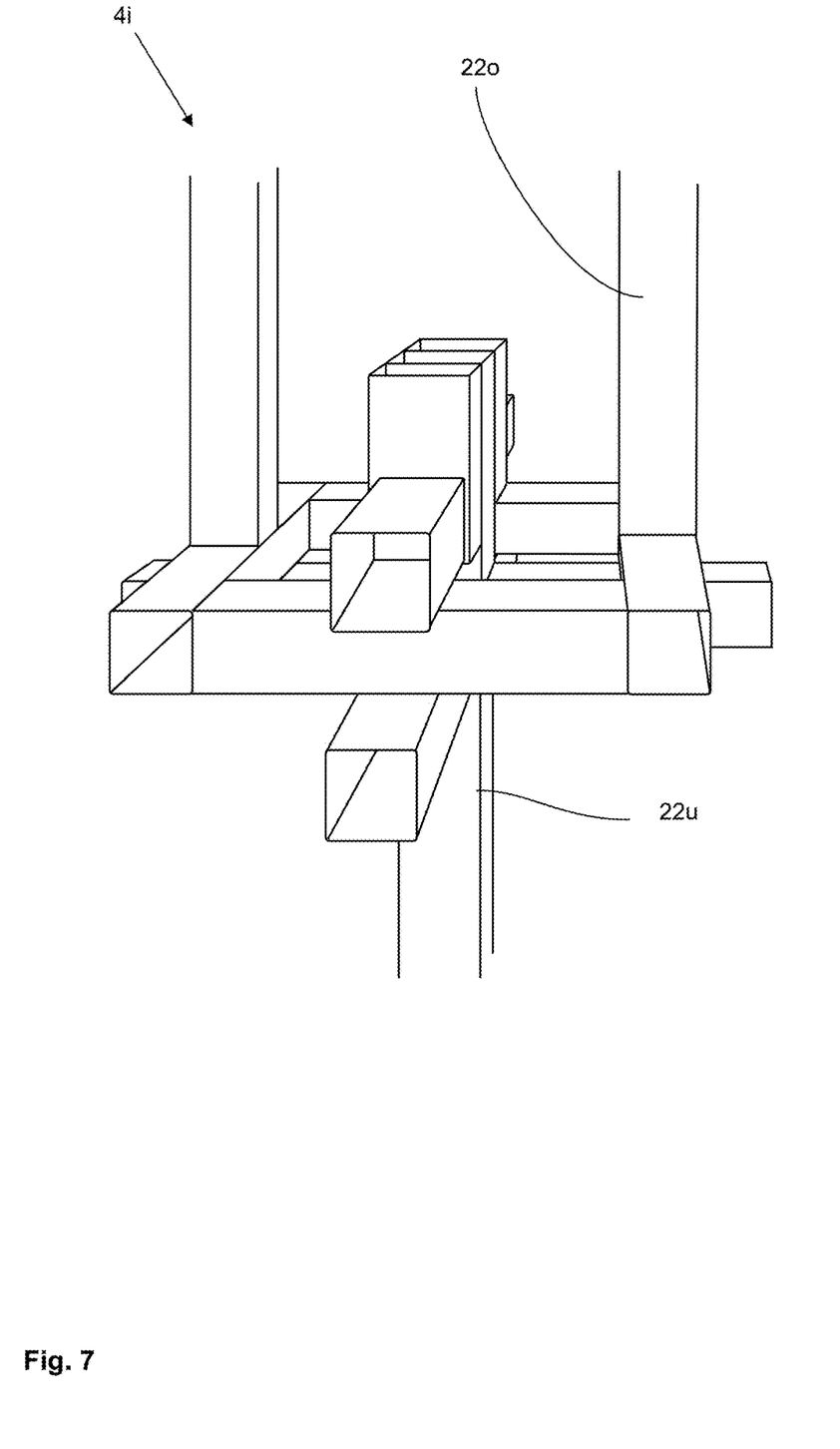
FIG. 7 shows a schematic view of an inner supporting mast.

As also shown in FIG. 6, in a supporting structure 1, shown in FIGS. 8 and 9, which comprises a plurality of supporting frameworks 2, the inner supporting masts 4i of the plurality of supporting frameworks 2 can have a first lower mast part 22u and a second upper mast part 220, wherein the second upper mast part 220 is received with its lower face at the upper end of the first lower mast part 22u so as to be movable in a floating manner in the horizontal direction.

As is also indicated in the view of FIG. 4 by the deflection roller, shown in dashed lines between the two pretensioning cables 8 of the front and rear right-hand supporting framework 2, and the actuator coupled thereto, or the schematically shown weight, the supporting cables 6 and/or the pretensioning cables 8 of two adjacent supporting frameworks 2 can be designed as a continuous supporting cable 6 or pretensioning cable 8 which is guided between the supporting frameworks 2 by means of a common cable pulley 24, which in order to change the tensile stress can be subjected to a desired adjustable pretensioning force by means of tensioning means, such as for example a tensioning weight 26 and/or a motor-operated actuator 26a.

Figure 5:
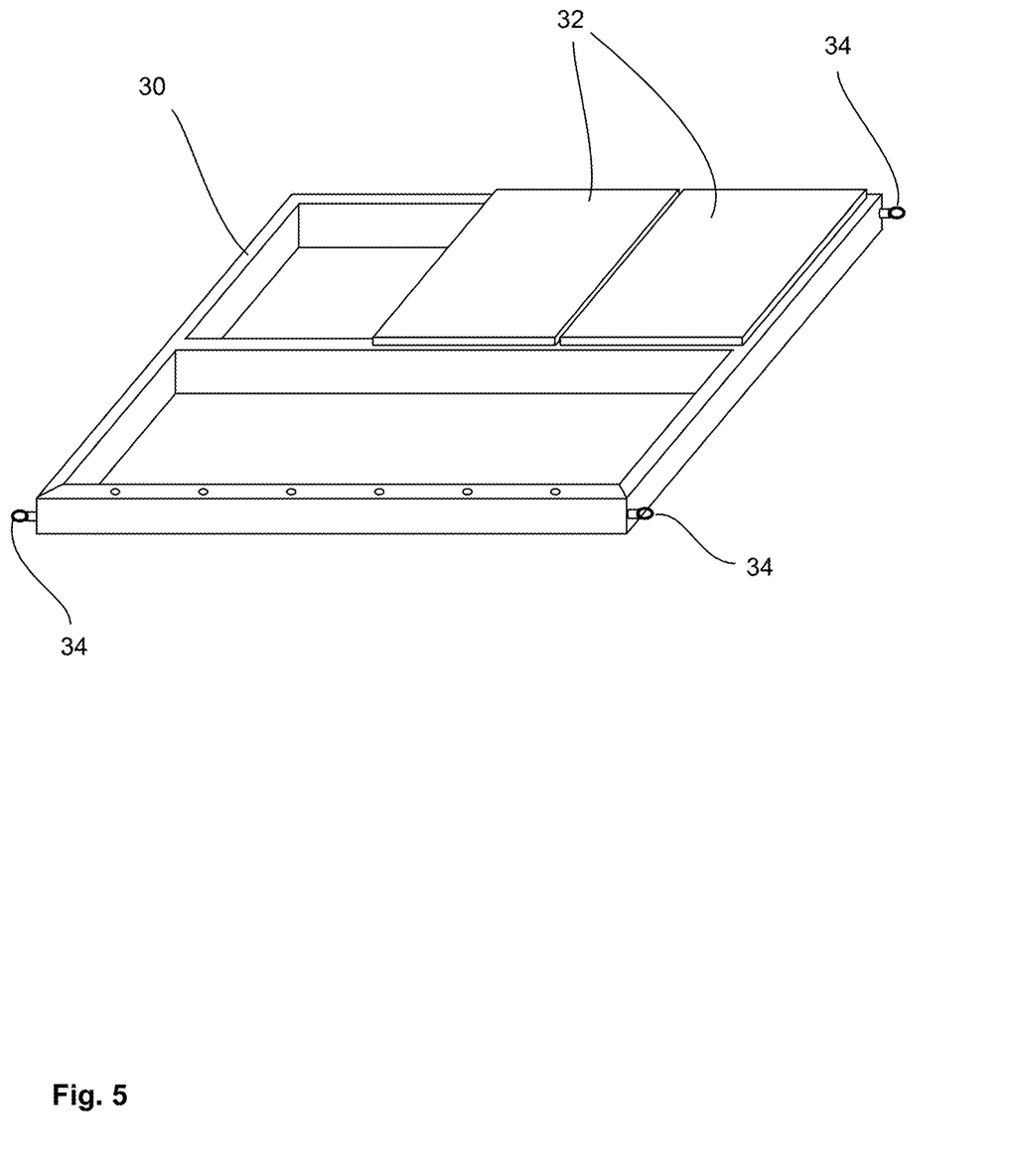
FIG. 5 shows a schematic view of an auxiliary frame with solar modules.

Furthermore, the solar modules or ceiling elements 32, as shown in FIG. 5, can be arranged on auxiliary frames 30, wherein for example three or more modules which are adjacent to one another and in parallel are fastened to an auxiliary frame 30. The auxiliary frames with the solar modules or ceiling elements 32 are connected in an articulated manner to the compression bars 12 of the supporting frameworks 2 by means of fastening means 34 which can comprise, as indicated in FIG. 6, eyes and/or chains and/or cables, the auxiliary frames 30 being received thereby in an articulated manner at the upper ends of the compression bars 12. A gimble-type receiver is also conceivable.

The supporting structure 1, shown in FIG. 8, is used for forming a solar roof, shown in FIG. 9, having a plurality of solar modules 32 which are arranged, for example, at a height of 4 or more meters above an area which is used as a parking lot or as a storage area or even as an agricultural area, for example. In the last case, in order to supply the plants with additional sunlight, ceiling elements 32 which consist of plastics or glass which is permeable to sunlight can be mounted at regular distances on the auxiliary frames 30, instead of the solar modules. Alternatively, it can be provided that some of the places which are occupied by solar modules on the auxiliary frames 30 can be left free, i.e. remain uncovered, in order to ensure sufficient ventilation, in particular in the case of large supporting structures of several 100 m in length, even in the center.

LIST OF REFERENCE SIGNS

1 Supporting structure
2 Supporting framework
4 Supporting mast
4i Inner supporting mast
4a Outer supporting mast
6 Supporting cable
8 Pretensioning cable
100 Upper positioning cable
10u Lower positioning cable
12 Compression bar
14 Fastening element
14a Cable pulleys
14b Sliding elements
16 Spacer rods
17 Lateral positioning cables
18 Transverse cable
20 Anchoring means
220 Upper mast part
22u Lower mast part
24 Deflection roller-cable pulley
26 Tensioning weight
26a Weight/actuator
30 Auxiliary frame
32 Solar module
34 Fastening means

The invention claimed is:

1. A supporting structure (1) for supporting a plurality of solar modules or ceiling elements (32), comprising at least two supporting frameworks (2) with each of the supporting frameworks having at least two supporting masts (4, 4a, 4i) wherein the at least two supporting masts are connected to one another by a supporting cable (6), the plurality of solar modules or ceiling elements (32) are supported by vertical compression bars (12) which are connected to the supporting cable (6) by fasteners (14), and which are subjected to a pretensioning force by at least one pretensioning cable (8), a pretensioning force applied to the pretensioning cable pushes the vertical compression bars (12) in a downward direction toward the supporting cable (6) which is connected to said vertical compression bars, characterized in that the fasteners comprise cable pulleys (14*a*) or sliding elements (14*b*), and are configured to displaceably couple the vertical compression bars (12) to the supporting cables (6) and pretensioning cables (8) and in that the vertical compression bars (12) are coupled to the supporting masts (4, 4*a*, 4*i*) non-displaceably in a horizontal direction by positioning cables (10) in order to avoid a horizontal movement of the vertical compression bars.

2. The supporting structure as claimed in claim 1, characterized in that the sliding elements (14*b*) comprise sliding shoes (14*b*) or eyes which encompass the supporting cables (6) and/or pretensioning cables (8).

3. The supporting structure as claimed in claim 1, characterized in that the fasteners (14) can be positioned at different heights on the vertical compression bars (12) and/or a length of the vertical compression bars (12) is adjustable.

4. The supporting structure as claimed in claim 1, characterized in that the pretensioning cables (8) and/or the supporting cables (6) comprise two or more cable sections which are connected together by shackles.

5. The supporting structure as claimed in claim 1, characterized in that the supporting cables (6) and/or the pretensioning cables (8) are multi-cables, wherein each multi-cable comprises two or more individual cables running in parallel to one another.

6. The supporting structure as claimed in claim 1, characterized in that the supporting cables (6) of two supporting frameworks (2) run in parallel to one another, when viewed in a longitudinal direction of the supporting structure (1), and in that the vertical compression bars (12) of the two supporting frameworks (2), when viewed in a transverse direction of the supporting structure (1), are arranged by means of spacer rods (16) at a fixed distance from one another and/or braced together by transverse cables (18).

7. The supporting structure as claimed in claim 1, characterized in that the supporting structure (1) comprises a plurality of outer masts (4*a*) at least one inner mast (4*i*), wherein the at least one inner mast has a first lower mast part (22*u*) and a second upper mast part (22*o*), wherein a lower face of the second upper mast part (22*o*) slidably engages with and upper end of the first lower mast part (22*u*) so as to be movable in the horizontal direction.

8. The supporting structure as claimed in claim 1, characterized in that the at least two supporting frameworks are positioned adjacent to one another and wherein the masts of the at least two adjacent supporting frameworks are connected by a continuous supporting cable (6) and/or pretensioning cable (8) which is guided between the at least two supporting frameworks (2), by a common cable pulley (24), and is subjected to the pretensioning force by a tensioner, wherein the tensioner comprises a tensioning weight (26) and/or a motor-operated actuator (26*a*).

9. The supporting structure as claimed in claim 1, characterized in that the plurality of solar modules or ceiling elements (32) are arranged on auxiliary frames (30) which are pivotably connected to the vertical compression bars (12) of the two supporting frameworks (2) by a link (34).

10. The supporting structure as claimed in claim 9, wherein the link (34) comprises eyes, chains and/or cables, the auxiliary frames (30) being able to be fastened thereby to the vertical compression bars (12).

11. A solar roof having a plurality of solar modules (32) which are received on a supporting structure (1) spanning an area at a distance, characterized in that the supporting structure (1) is configured as claimed in claim 1.

* * * * *